United States Patent
Zhu et al.

(10) Patent No.: US 7,658,083 B2
(45) Date of Patent: Feb. 9, 2010

(54) COOLING SYSTEM AND METHOD FOR COOLING A BATTERY IN A VEHICLE

(75) Inventors: Douglas Zhu, Canton, MI (US); Patrick Maguire, Ann Arbor, MI (US); Jacob Mathews, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 563 days.

(21) Appl. No.: 11/161,190

(22) Filed: Jul. 26, 2005

(65) Prior Publication Data

US 2007/0022772 A1   Feb. 1, 2007

(51) Int. Cl.
*B60H 1/32* (2006.01)
(52) U.S. Cl. .......................................... 62/243; 62/244
(58) Field of Classification Search .................. 62/186, 62/229, 230, 239, 244, 500, 243; 219/202, 219/240
See application file for complete search history.

(56) References Cited

U.S. PATENT DOCUMENTS

| | | | |
|---|---|---|---|
| 5,490,572 A | 2/1996 | Tajiri et al. | |
| 5,937,664 A | 8/1999 | Matsuno et al. | |
| 6,394,210 B2* | 5/2002 | Matsuda et al. | 180/68.1 |
| 6,481,230 B2* | 11/2002 | Kimishima et al. | 62/239 |
| 6,705,101 B2 | 3/2004 | Brotz et al. | |
| 6,750,630 B2 | 6/2004 | Inoue et al. | |
| 6,892,549 B2* | 5/2005 | Komura et al. | 62/228.5 |
| 2004/0069012 A1* | 4/2004 | Inoue | 62/500 |
| 2005/0044873 A1* | 3/2005 | Tamai et al. | 62/323.1 |
| 2005/0109499 A1* | 5/2005 | Iwanami et al. | 165/202 |

FOREIGN PATENT DOCUMENTS

| | | |
|---|---|---|
| FR | 2 819 344 A1 | 7/2002 |
| FR | 2 819 345 A1 | 7/2002 |

* cited by examiner

*Primary Examiner*—Melvin Jones
(74) *Attorney, Agent, or Firm*—David B. Kelley; Brooks Kushman P.C.

(57) ABSTRACT

A cooling system and method for cooling a battery in a vehicle is provided. The method includes determining whether the cooling system is operating to cool a passenger compartment in the vehicle, operating the cooling system to cool the battery when it is determined that the cooling system is operating to cool the passenger compartment, and it is determined that at least one predetermined condition is met. The method also includes determining whether an engine in the vehicle is operating, and then operating the cooling system to cool the battery when it is determined that the engine is operating and a battery temperature is greater than a predetermined battery temperature.

16 Claims, 7 Drawing Sheets

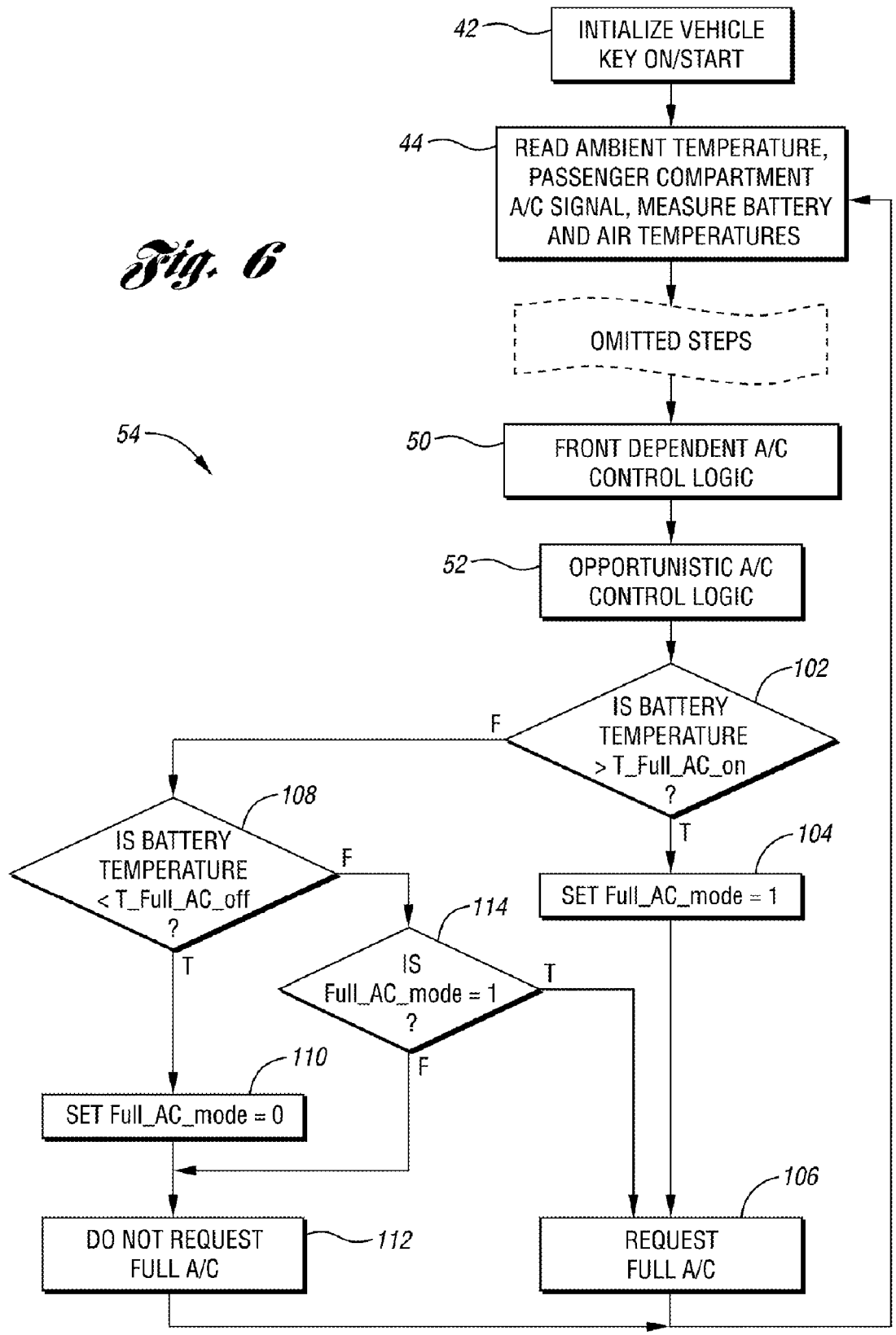

COOLING SYSTEM AND METHOD FOR COOLING A BATTERY IN A VEHICLE

BACKGROUND OF THE INVENTION

1. Field of the Invention

The present invention relates to a cooling system and method for cooling a battery in a vehicle.

2. Background Art

When a battery is used to provide power to an electric motor to drive a vehicle, the temperature of the battery can increase significantly when the motor is operating for extended periods of time. The increase in battery temperature may be compounded when the battery is confined to relatively small, enclosed spaces. Increases in battery temperature can reduce battery charge efficiency and impede battery performance. If the battery is not cooled, battery life and fuel economy may suffer. Reducing battery usage may partially alleviate this condition, but this can affect vehicle performance and fuel economy.

Typically, vehicles have a passenger air conditioning system to cool the passenger compartment. The passenger air conditioning system includes a compressor, a refrigerant line and a heat exchanger. One way to address high battery temperatures is to use at least a portion of the passenger compartment air conditioning system to cool the battery. Because the air conditioning system is used to cool the passenger compartment, the same compressor can be used to cool the battery, but with a different refrigerant line and heat exchanger. Inefficient use of the passenger compartment air conditioning system to cool the battery, however, can adversely affect the fuel economy of the vehicle.

Thus, a need exists for a cooling system and a method of cooling a battery in a vehicle that can efficiently cool both the passenger compartment and the battery.

SUMMARY OF THE INVENTION

The invention provides a method for cooling a battery in a vehicle having a cooling system. The method includes determining whether the cooling system is operating to cool a passenger compartment in the vehicle, operating the cooling system to cool the battery when it is determined that the cooling system is operating to cool the passenger compartment, and it is determined that at least one predetermined condition is met. The method also includes determining whether an engine in the vehicle is operating, and then operating the cooling system to cool the battery when it is determined that the engine is operating and a battery temperature is greater than a predetermined battery temperature.

The invention also provides a method that includes operating the cooling system in a first battery cooling mode when the cooling system is operating to cool a passenger compartment in the vehicle and at least one predetermined condition is met. The method also includes operating the cooling system in a second battery cooling mode when an engine in the vehicle is operating and a battery temperature is greater than a predetermined battery temperature.

A cooling system for a vehicle is also provided. The vehicle includes an engine, a passenger compartment, and a battery. The cooling system includes a first portion selectively operable to cool the passenger compartment and a second portion selectively operable to cool the battery. The system also includes a control system including at least one controller. The control system is configured to receive signals related to a temperature of ambient air outside the vehicle, a temperature of the battery, and operation of the engine. The control system is also configured to operate the cooling system to cool the passenger compartment. It is further configured to operate the cooling system to cool the battery when the cooling system is being operated to cool the passenger compartment. The control system also operates the cooling system to cool the battery when the engine is operating and the battery temperature is greater than a predetermined battery temperature.

BRIEF DESCRIPTION OF THE DRAWINGS

FIG. 6 is a flow chart illustrating details of a third portion of the method shown in FIG. 3.

DETAILED DESCRIPTION OF THE PREFERRED EMBODIMENT(S)

Figure 1:
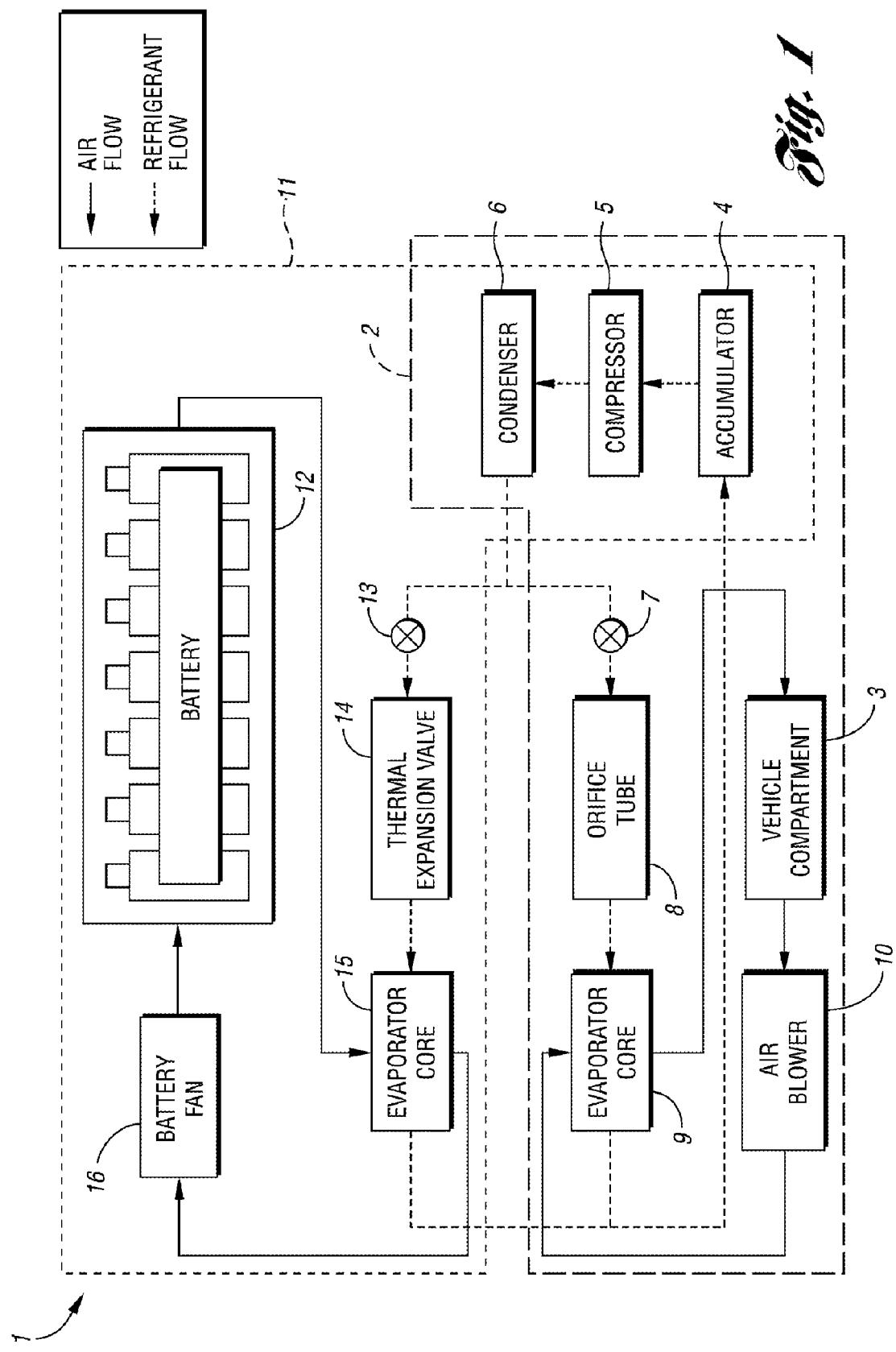
FIG. 1 is a schematic representation of a cooling system in accordance with an embodiment of the present invention.

FIG. 1 shows a cooling system 1 in accordance with an embodiment of the present invention. The cooling system 1 includes a passenger compartment air conditioning (A/C) system 2 capable of cooling the vehicle compartment 3. The passenger compartment A/C system 2 includes an accumulator 4, a compressor 5, a condenser 6, a shutoff vale 7, an orifice tube 8 and an evaporator core 9. These elements are configured to allow a refrigerant to flow between them and operate in a manner consistent with the art. The flow of refrigerant is determined in part by the shutoff valve 7.

The passenger compartment A/C system 2 also includes an air blower 10 operable to facilitate air flow between the evaporator core 9 and the vehicle compartment 3. The cooling system 1 also includes a battery A/C system 11 capable of cooling the battery 12. The battery A/C system 11 includes a shutoff valve 13, a thermal expansion valve 14 and an evaporator core 15.

The battery A/C system 11 shares the accumulator 4, compressor 5 and condenser 6 with the passenger compartment A/C system 2. These elements are configured to allow a refrigerant to flow between them and operate in a manner consistent with the art. The flow of refrigerant between the thermal expansion valve 14 and evaporator core 15 is determined by the shutoff valve 13. The battery A/C system 11 also includes a battery fan 16 operable to facilitate air flow between the battery 12 and the evaporator core 15.

Figure 2:
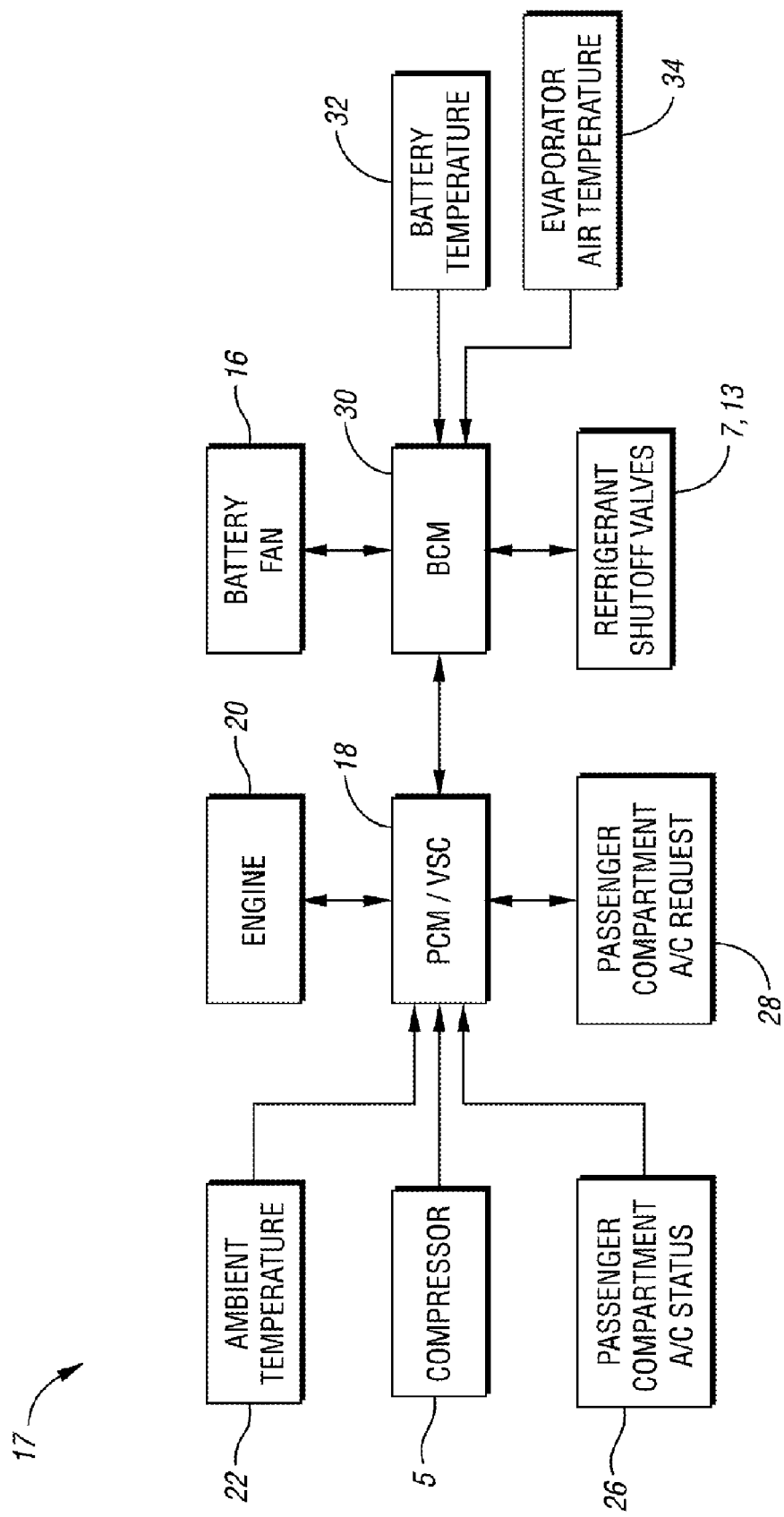
FIG. 2 is a schematic representation of control interfaces of the A/C cooling system shown in FIG. 1.

FIG. 2 shows cooling control interfaces 17 for the cooling system 1 of FIG. 1. Referring to FIGS. 1 and 2, the powertrain control module (PCM)/vehicle system controller (VSC) 18 is a controller that receives data concerning the engine 20, the ambient air temperature 22, the compressor 5, the passenger compartment A/C status 26 and the passenger compartment A/C request 28. The PCM/VSC 18 provides this data to another controller, a battery control module (BCM) 30. The BCM 30 also receives data concerning the battery temperature 32, the evaporator air temperature 34 associated with the evaporator core 15, the battery fan 16 and the shutoff valves 7, 13. The BCM 30 receives data concerning the battery temperature 32 and the evaporator air temperature 34 from devices associated with the cooling system 1. Based on the method to be described in FIGS. 3-6, the BCM 30 determines which A/C mode should be requested, and sends the request along with necessary information, including the battery temperature 32 and evaporator air temperature 34, to the PCM/VSC 18. The PCM/VSC 18 commands the BCM 30 to turn on or off the shutoff valve 13. Although this embodiment utilizes two controllers, the invention may also be practiced with a single controller or several controllers in communication with each other.

Figure 3:
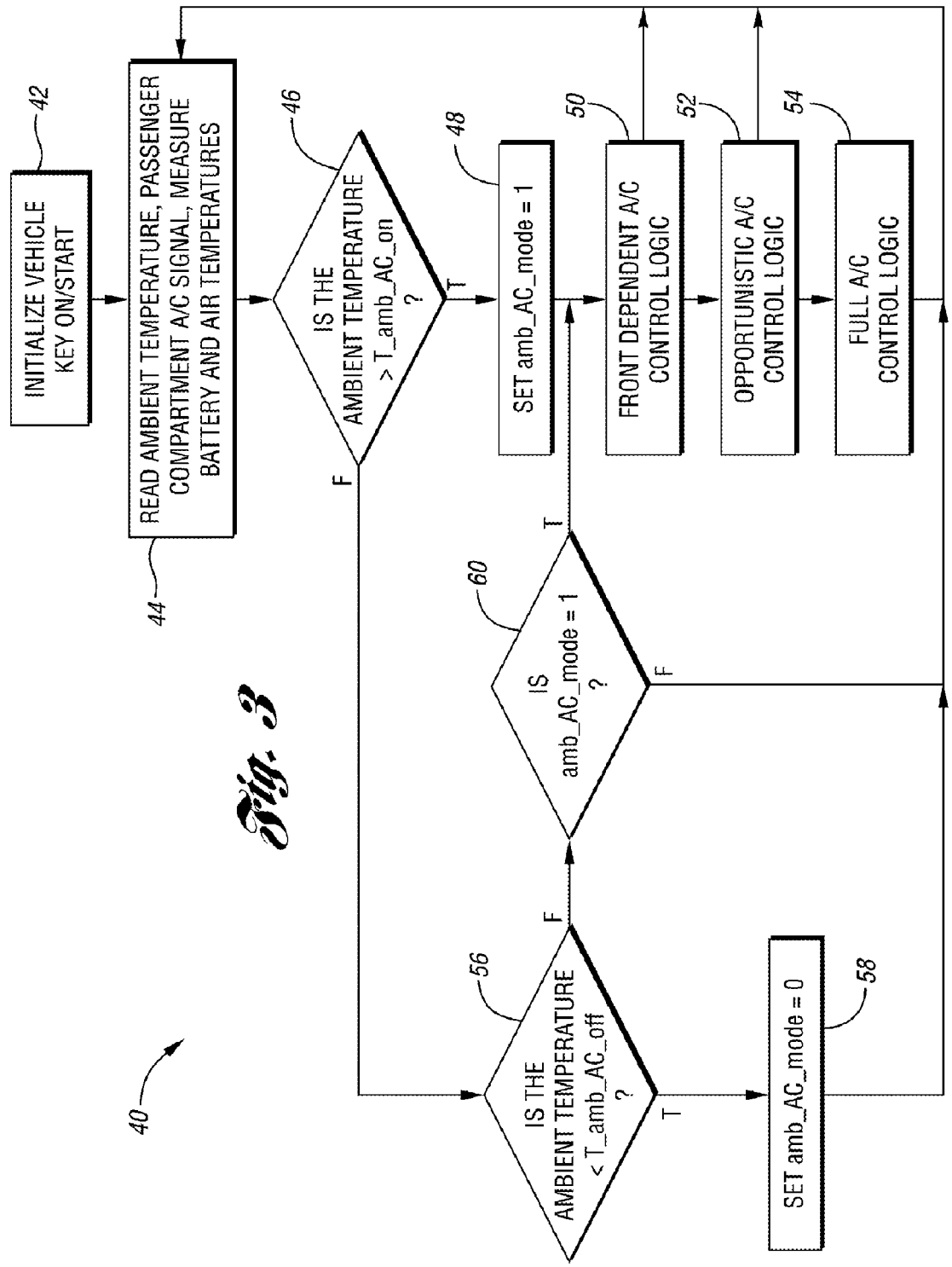
FIG. 3 is a flow chart illustrating a method in accordance with an embodiment of the present invention.

FIG. 3 shows the method 40 employed by the BCM 30. Referring to FIGS. 2 and 3, at block 42 the method initializes by a vehicle key on/start. At block 44, the BCM 30 receives data concerning the ambient air temperature 22 and the passenger compartment A/C status 26 from the PCM/VSC 18, and receives data concerning the battery temperature 32 and evaporator air temperature 34. At condition block 46, the BCM 30 determines if the ambient temperature 22 is greater than a threshold temperature, for example, 8° C. The use of a threshold temperature precludes the battery A/C system 11 from operating if the ambient temperature is too low. If the condition 46 is true, the BCM 30 sets the amb_AC_mode flag to one (1) at block 48. This flag will be later used to prevent the battery A/C system 11 from toggling on and off if the ambient temperature 22 fluctuates around the temperature threshold. Other flags are used in a similar fashion to prevent the battery A/C system 11 from unnecessarily toggling on and off. The BCM 30 then determines which cooling mode, for example, Front Dependent A/C 50, Opportunistic A/C 52 or Full A/C 54 should be requested. This determination can be done in any sequence, for example Full A/C 54, Opportunistic A/C 52 then Front Dependent A/C 50. The determination may also be done simultaneously.

If the condition 46 is false, the BCM 30 determines, at condition block 56, if the ambient temperature 22 is less than a threshold temperature, for example, 5° C. This threshold is typically less than the temperature threshold at condition block 46. If the condition 56 is true, the BCM 30 sets the amb_AC_mode flag to zero (0) at block 58. The BCM 30 then returns to block 44. If the condition 56 is false, the BCM 30 determines, at condition block 60, if the amb_AC_mode flag is equal to one (1). If the condition 60 is false, the BCM 30 returns to block 44. If the condition 60 is true, the BCM 30 then determines if Front Dependent A/C 50, Opportunistic A/C 52 and Full A/C 54 should be requested. As discussed earlier, the BCM 30 can perform this determination in any sequence or simultaneously.

The difference between the threshold temperatures at condition blocks 46 and 56 prevents the A/C cooling request from oscillating if the ambient temperature 22 fluctuates around the temperature threshold at condition block 46.

Figure 4A:
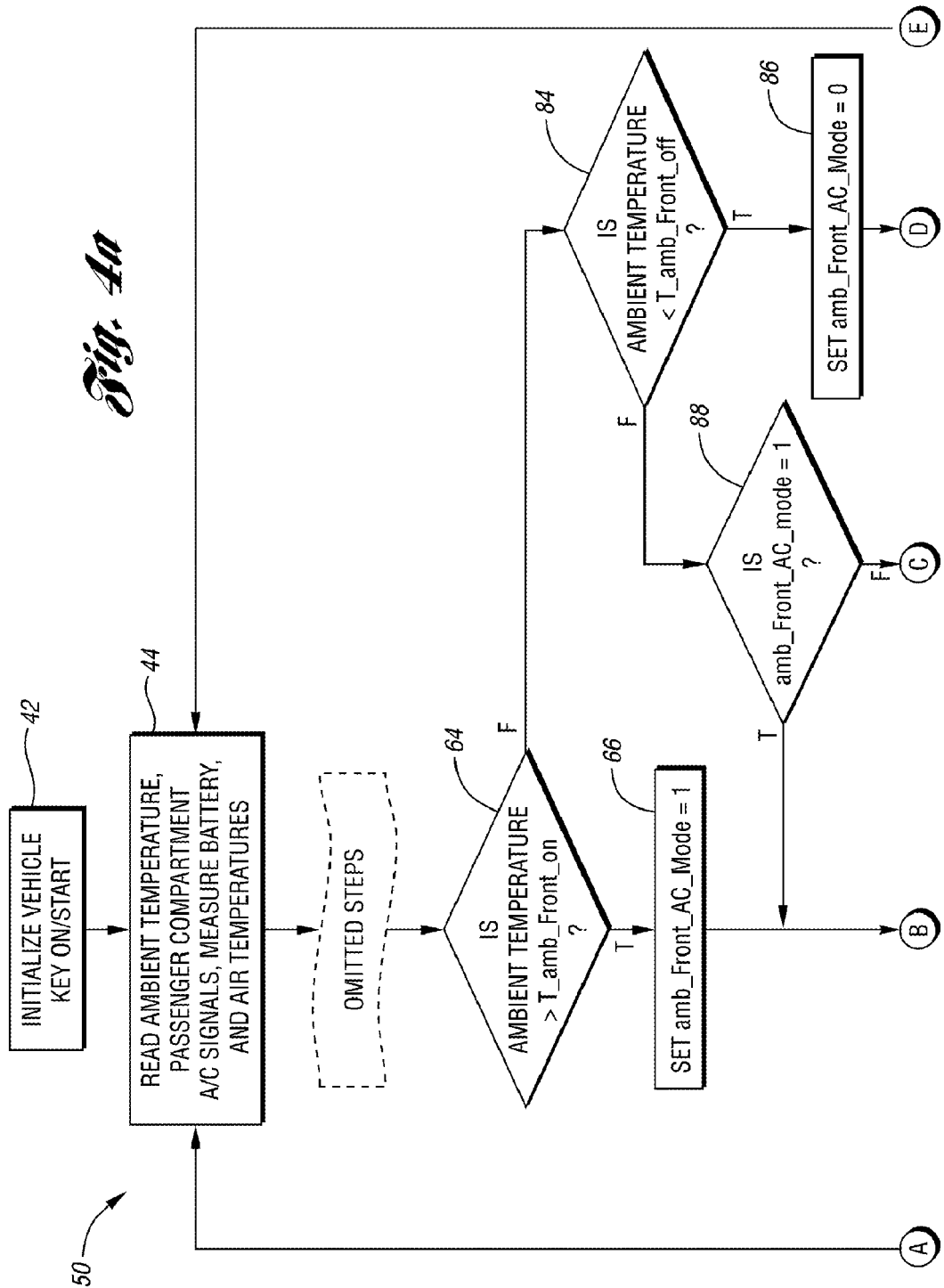
FIGS. 4a and 4b are a flow chart illustrating details of a portion of the method shown in FIG. 3.
Figure 4B:
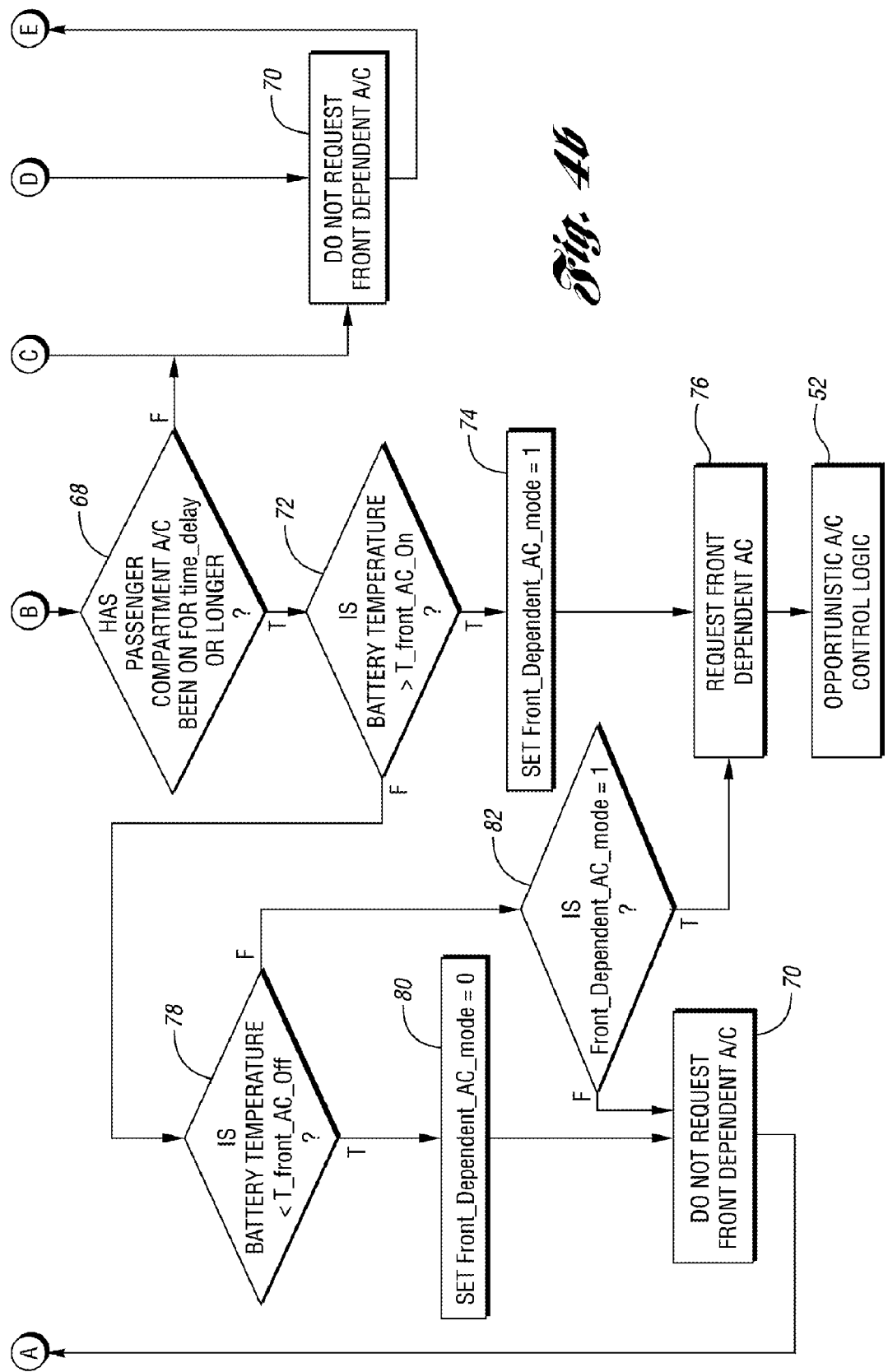

FIGS. 4a and 4b show the Front Dependent A/C Control Logic 50 employed by the BCM 30. To improve fuel economy, the Front Dependent A/C Control Logic 50 cools the battery 12 sooner than Opportunistic A/C Logic 52 if an occupant of the vehicle is already using the passenger compartment A/C system 2. The load imposed by the battery A/C system 11 on the cooling system 1 is relatively small if the passenger compartment A/C system 2 is active.

The BCM 30 determines, at condition block 64, if the ambient temperature 22 is greater than a threshold, for example 14° C. This threshold is typically higher than the temperature threshold at condition block 46. The temperature threshold at condition block 64 prevents the battery A/C system 11 from operating unless the ambient temperature 22 reaches a value warranting possible battery cooling. If the condition 64 is true, the BCM 30 sets, at block 66, the amb_Front_AC_mode flag equal to one (1). At condition block 68, the BCM 30 determines if the passenger compartment A/C system 2 has been active for at least a period of time, for example fifteen (15) seconds. This time period prevents the battery A/C system 11 from toggling on and off if the vehicle occupant toggles the passenger compartment A/C system 2 on and off. If the condition 68 is false, the BCM 30 does not request Front Dependent A/C at block 70. The BCM 30 then returns to block 44. If the condition 68 is true, the BCM 30 determines, at condition block 72, if the battery temperature 32 is greater than a battery temperature threshold, for example, 27° C. This threshold prevents the battery A/C system 11 from operating unless the battery temperature 32 reaches a value warranting possible battery cooling. If the condition 72 is true, the BCM 30 sets, at block 74, the Front_Dependent_AC_mode flag equal to one (1). At block 76, the BCM 30 requests Front Dependent A/C. The BCM 30 then proceeds to the Opportunistic A/C Control Logic 52.

If the condition 72 is false, the BCM 30 determines, at condition block 78, if the battery temperature 32 is less than a battery temperature threshold, for example, 22° C. If the condition 78 is true, the BCM 30 sets, at block 80, the Front_Dependent_AC_mode flag to zero (0). At block 70, the BCM 30 does not request Front Dependent A/C. The BCM 30 then returns to block 44. If the condition 78 is false, the BCM 30 determines, at condition block 82, if the Front_Dependent_AC_mode flag is equal to one (1). If the condition 82 is false, the BCM 30, at block 70, does not request Front Dependent A/C. The BCM 30 then returns to block 44. If the condition 82 is true, the BCM 30 requests, at block 76, Front Dependent A/C and then proceeds to the Opportunistic A/C Control Logic 52.

The difference between the battery temperature thresholds at condition blocks 72 and 78 prevents the Front Dependent A/C cooling request from oscillating if the battery temperature 32 fluctuates around the battery temperature threshold at condition block 72.

Referring back to condition block 64, if the condition 64 is false, the BCM 30 determines, at condition block 84, if the ambient temperature 22 is less than a threshold, for example, 11° C. If the condition 84 is true, the BCM 30 sets the amb_Front_AC_mode flag to zero (0) at block 86. At block 70, the BCM 30 does not request Front Dependent A/C. The BCM 30 then returns to block 44.

If the condition 84 is false, the BCM 30 determines, at condition block 88, if the amb_Front_AC_mode flag is equal to one (1). If the condition 88 is false, the BCM 30, at block 70, does not request Front Dependent A/C. The BCM 30 then returns to block 44. If the condition 88 is true, the BCM 30 proceeds to condition block 68 and continues as described earlier.

The difference between the ambient temperature thresholds at condition blocks 64 and 84 prevents the Front Dependent A/C cooling request from oscillating if the ambient temperature 22 fluctuates around the ambient temperature thresholds at condition block 64.

Figure 5:
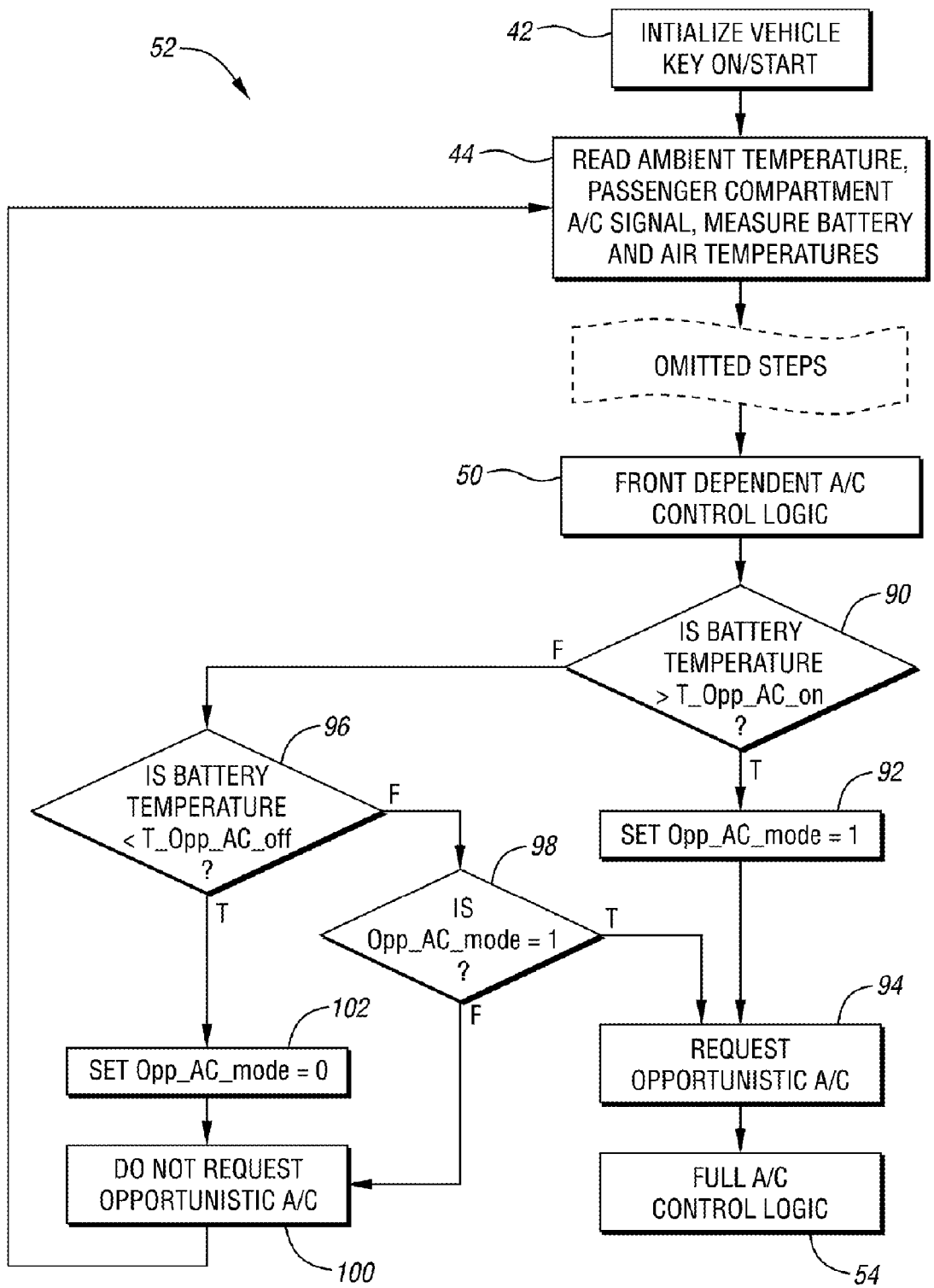
FIG. 5 is a flow chart illustrating details of another portion of the method shown in FIG. 3.

FIG. 5 illustrates the Opportunistic A/C Control Logic 52 employed by the BCM 30. At condition block 90, the BCM 30 determines if the battery temperature 32 is greater than a battery temperature threshold, for example, 32° C. This temperature threshold is typically higher than the battery temperature threshold at condition block 72 associated with the Front Dependent A/C Control Logic 50 of FIGS. 4a and 4b. A higher battery temperature 32 may require the more responsive cooling offered by the Opportunistic A/C Control Logic 52 relative to the Front Dependent A/C Control Logic 50. If the condition 90 is true, the BCM 30 sets, at block 92, the Opp_AC_mode flag equal to one (1). The BCM 30 requests Opportunistic A/C at block 94. The request for Opportunistic A/C will only be granted by the PCM/VSC 18 if the engine 20 is active. Opportunistic A/C cooling can be inefficient if the engine 20 is not active. If the engine 20 is not active, the battery 12 will not be actively cooled by the battery A/C system 11. The BCM 30 then proceeds to Full A/C Control Logic 54.

If the condition 90 is false, the BCM 30 determines, at condition block 96, if the battery temperature 32 is less than a battery temperature threshold, for example, 27° C. If the condition 96 is false, the BCM 30 determines, at condition block 98, if the Opp_AC_mode flag is equal to one (1). If the condition 98 is true, the BCM 30 requests Opportunistic A/C at block 94. The BCM 30 then proceeds to Full A/C Control Logic 54. If the condition 98 is false, the BCM 30, at block 100, does not request Opportunistic A/C. The BCM 30 then returns to block 44. If the condition 96 is true, the BCM 30 sets, at block 102, the Opp_AC_mode flag equal to zero (0). At block 100, the BCM 30 does not request Opportunistic A/C. The BCM 30 then returns to block 44.

The difference between the battery temperature thresholds at condition blocks 90 and 96 prevents the Opportunistic A/C cooling request from oscillating if the battery temperature 32 fluctuates around the battery temperature threshold at condition block 90.

FIG. 6 shows the Full A/C Control Logic 54 employed by the BCM 30. If driving is aggressive or if the ambient air temperature 22 is extremely hot, the Opportunistic A/C cooling may not optimally cool the battery. During Full A/C cooling, the PCM/VSC 18 will keep the engine 20 active continuously until the desired battery temperature 32 is achieved.

At condition block 102, the BCM 30 determines if the battery temperature 32 is greater than a battery temperature threshold, for example, 38° C. If the condition 102 is true, the BCM 30 sets, at block 104, the Full_AC_mode flag equal to one (1). The BCM 30 requests Full A/C at block 106. The BCM 30 then returns to block 44. If the condition 102 is false, the BCM 30 determines, at condition block 108, if the battery temperature 32 is less than a battery temperature threshold, for example 35° C.

If the condition 108 is true, the BCM 30 sets, at block 110, the Full_AC_mode flag to zero (0). At block 112, the BCM 30 does not request Full A/C. The BCM 30 then returns to block 44. If the condition 108 is false, the BCM 30 determines, at condition block 114, if the Full_AC_mode flag is equal to one (1). If the condition 114 is true, the BCM 30 requests, at block 106, Full A/C. The BCM 30 then returns to block 44. If the condition 114 is false, the BCM 30 does not request Full A/C at block 112. The BCM 30 then returns to block 44.

The difference between the battery temperature thresholds at blocks 102 and 108 prevents the Full A/C cooling request from oscillating if the battery temperature 32 fluctuates around the battery temperature threshold at condition block 102.

While the best mode for carrying out the invention has been described in detail, those familiar with the art to which this invention relates will recognize various alternative designs and embodiments for practicing the invention as defined by the following claims.

What is claimed is:

1. A method for cooling a battery in a vehicle including an engine, a passenger compartment, and a cooling system operable to selectively cool the battery, the passenger compartment, or the battery and the passenger compartment together, the method comprising:

determining whether the cooling system is operating to cool the passenger compartment;

operating the cooling system to cool the battery when it is determined that the cooling system is operating to cool the passenger compartment, and it is determined that at least one predetermined condition is met, the at least one predetermined condition being chosen from a set of predetermined conditions, including a temperature of the battery being greater than a first predetermined battery temperature and less than a second predetermined battery temperature and the cooling system operating to cool the passenger compartment for at least a first predetermined time;

determining whether the engine is operating; and operating the cooling system to cool the battery when it is determined that the engine is operating and the battery temperature is greater than the second predetermined battery temperature and less than a third predetermined battery temperature.

2. The method of claim 1, further comprising:

commanding the engine to operate when the battery temperature is greater than the third predetermined battery temperature, which is greater than the second predetermined battery temperature; and operating the cooling system to cool the battery after the engine is commanded to operate.

3. The method of claim 1, wherein the set of predetermined conditions further includes a temperature of ambient air outside the vehicle being greater than a first predetermined ambient air temperature.

4. The method of claim 1, wherein the cooling system is operated to cool the battery when it is determined that the cooling system has been operating to cool the passenger compartment for at least a first predetermined time, and the temperature of the battery is greater than the first predetermined battery temperature and less than the second predetermined battery temperature.

5. A method for cooling a battery in a vehicle including an engine, a passenger compartment, and a cooling system selectively operable to cool the battery, the passenger compartment, or the battery and the passenger compartment, the method comprising:

operating the cooling system in a first battery cooling mode when the cooling system is operating to cool the passenger compartment and when at least one predetermined condition is met, the at least one predetermined condition being chosen from a set of predetermined conditions, including a temperature of the battery being greater than a first predetermined battery temperature and less than a second predetermined battery temperature and the cooling system operating to cool the passenger compartment for at least a first predetermined time; and operating the cooling system in a second battery cooling mode when the engine is operating and when the battery temperature is greater than the second predetermined battery temperature and less than a third predetermined battery temperature.

6. The method of 5, further comprising operating the cooling system in a third battery cooling mode when the battery temperature is greater than the third predetermined battery temperature, the third battery cooling mode including commanding the engine to operate, and operating the cooling system to cool the battery after the engine is commanded to operate.

7. The method of claim 5, wherein the set of predetermined conditions further includes a temperature of ambient air outside the vehicle being greater than a first predetermined ambient air temperature.

8. The method of claim 5, wherein the cooling system is operated in the first battery cooling mode when it is determined that the cooling system has been operating to cool the passenger compartment for at least a first predetermined time, and the temperature of the battery is greater than the first predetermined battery temperature and less than the second predetermined battery temperature.

9. A cooling system for a vehicle including an engine, a passenger compartment, and a battery, the cooling system comprising:
   a first portion selectively operable to cool the passenger compartment;
   a second portion selectively operable to cool the battery, the first and second portions being selectively operable to cool the passenger compartment and the battery concurrently;
   a control system including at least one controller, the control system being configured to:
      receive signals related to a temperature of ambient air outside the vehicle, a temperature of the battery, and operation of the engine,
      operate the cooling system to cool the passenger compartment based on at least one command from a vehicle occupant,
      operate the cooling system to cool the battery when the cooling system is being operated to cool the passenger compartment and at least one predetermined condition is met, the at least one predetermined condition being chosen from a set of predetermined conditions, including a temperature of the battery being greater than a first predetermined battery temperature and less than a second predetermined battery temperature, and
      operate the cooling system to cool the battery when the engine is operating and the battery temperature is greater than the second predetermined battery temperature and less than a third predetermined battery temperature.

10. The cooling system of claim 9, wherein the control system is further configured to command the engine to operate when the battery temperature is greater than the third predetermined battery temperature which is greater than the second predetermined battery temperature, and to operate the cooling system to cool the battery after the engine is commanded to operate.

11. The cooling system of claim 9, wherein the set of predetermined conditions further includes a temperature of ambient air outside the vehicle being greater than a first predetermined ambient air temperature.

12. The cooling system of claim 9, wherein the set of predetermined conditions further includes the cooling system operating to cool the passenger compartment for at least a first predetermined time.

13. The cooling system of claim 9, wherein the control system is further configured to cool the battery when it is determined that the cooling system has been operating to cool the passenger compartment for at least a first predetermined time, and the temperature of the battery is greater than the first predetermined battery temperature and less than the second predetermined battery temperature.

14. The cooling system of claim 9, wherein the first portion includes:
   a compressor for compressing a refrigerant fluid,
   a condenser for condensing the refrigerant fluid after it is compressed,
   a first expansion device for expanding at least some of the refrigerant fluid after it is condensed, and
   a first evaporator for evaporating at least some of the refrigerant fluid after it expands, thereby cooling air for the passenger compartment as it passes over the first evaporator.

15. The cooling system of claim 14, wherein the second portion includes:
   the compressor,
   the condenser,
   a second expansion device for expanding at least some of the refrigerant fluid after it is condensed, and
   a second evaporator for evaporating at least some of the refrigerant fluid after it expands, thereby cooling air for the battery as it passes over the second evaporator.

16. The cooling system of claim 15, wherein the first and second portions further include an accumulator for accumulating at least partially evaporated refrigerant fluid from the first and second evaporators.

* * * * *